United States Patent
Chen et al.

(10) Patent No.: US 12,386,457 B2
(45) Date of Patent: Aug. 12, 2025

(54) ELECTRONIC DEVICE

(71) Applicant: InnoLux Corporation, Miao-Li County (TW)

(72) Inventors: Chih-Yi Chen, Miao-Li County (TW); Yu-Sheng Kao, Miao-Li County (TW); Chun-Li Chu, Miao-Li County (TW); Wei-Kang Ji, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/925,246

(22) Filed: Oct. 24, 2024

(65) Prior Publication Data
US 2025/0165095 A1    May 22, 2025

(30) Foreign Application Priority Data
Nov. 22, 2023 (TW) ................. 112145057

(51) Int. Cl.
*G06F 3/041* (2006.01)
(52) U.S. Cl.
CPC ................. *G06F 3/04166* (2019.05)
(58) Field of Classification Search
None
See application file for complete search history.

(56) References Cited

U.S. PATENT DOCUMENTS

| | | | |
|---|---|---|---|
| 10,474,280 B2* | 11/2019 | Jang | G06F 3/03545 |
| 2016/0077617 A1* | 3/2016 | Lee | G06F 3/04184 |
| | | | 345/173 |
| 2019/0371255 A1* | 12/2019 | Tian | G06F 3/0412 |
| 2023/0058621 A1* | 2/2023 | Kim | G06F 3/04184 |
| 2024/0321898 A1 | 9/2024 | Shuai | |

FOREIGN PATENT DOCUMENTS

| CN | 108550351 A | 9/2018 |
|---|---|---|
| CN | 115877977 A | 3/2023 |

* cited by examiner

*Primary Examiner* — Krishna P Neupane
(74) *Attorney, Agent, or Firm* — McClure, Qualey & Rodack, LLP

(57) ABSTRACT

An electronic device includes: a display panel; a light-emitting element layer providing a light source to the display panel; a touch element overlapping the display panel; a timing control unit electrically connected to the display panel and providing a first synchronization signal; a light source driving unit electrically connected to the light-emitting element layer and receiving the first synchronization signal; and a touch processing unit electrically connected to the touch element and receiving the first synchronization signal. The display panel is displaying a first frame, and a duration of the first frame includes a duration of the first synchronization signal, a first duration, and a second duration. Within the first duration, the touch processing unit receives a touch signal from the touch processing unit. Within the second unit, the light source driving unit has the light-emitting element layer perform scanning. The first duration and the second duration are separated.

20 Claims, 4 Drawing Sheets

ELECTRONIC DEVICE

CROSS REFERENCE TO RELATED APPLICATIONS

This application claims priority of Taiwan Patent Application No. 112145057, filed Nov. 22, 2023, the entirety of which is incorporated by reference herein.

BACKGROUND

Technical Field

The present disclosure relates to an electronic device, and in particular, to a method of manufacturing an electronic device having a timing control unit.

Description of the Related Art

As the applications for electronic devices continue to grow, the development of display technology has also become more innovative. However, facing different manufacturing conditions and techniques, the demands on the structure and quality of the electronic devices have been increasing, causing the manufacturing of electronic devices to become more challenging.

In conventional touch display devices, the signal of the touch element may be interfered with by the signal of the driving circuit of the light-emitting element layer, leading to interference with the touch operation, and display defects (for example, a ghost point) may be generated. The touch display devices may generate noise, which in turn affects the image displayed on the display panel.

Therefore, how to prevent signal cross interference between the touch element and the driving circuit of a light-emitting element layer remains an issue that the industry is committed to studying.

SUMMARY

An electronic device includes: a display panel; a light-emitting element layer used for providing a light source to the display panel; a touch element layer overlapping the display panel; a timing control unit electrically connected to the display panel and used for providing a first synchronization signal; a light source driving unit electrically connected to the light-emitting element layer and used for receiving the first synchronization signal; and a touch processing unit electrically connected to the touch element layer and used for receiving the first synchronization signal. The display panel is used for displaying a first frame, and a duration of the first frame includes a duration of the first synchronization signal, a first duration, and a second duration. Within the first duration, the touch processing unit receives a touch signal from the touch element layer. Within the second duration, the light source driving unit has the light-emitting element layer perform scanning. The first duration and the second duration are separated.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

DETAILED DESCRIPTION

Figure 1:
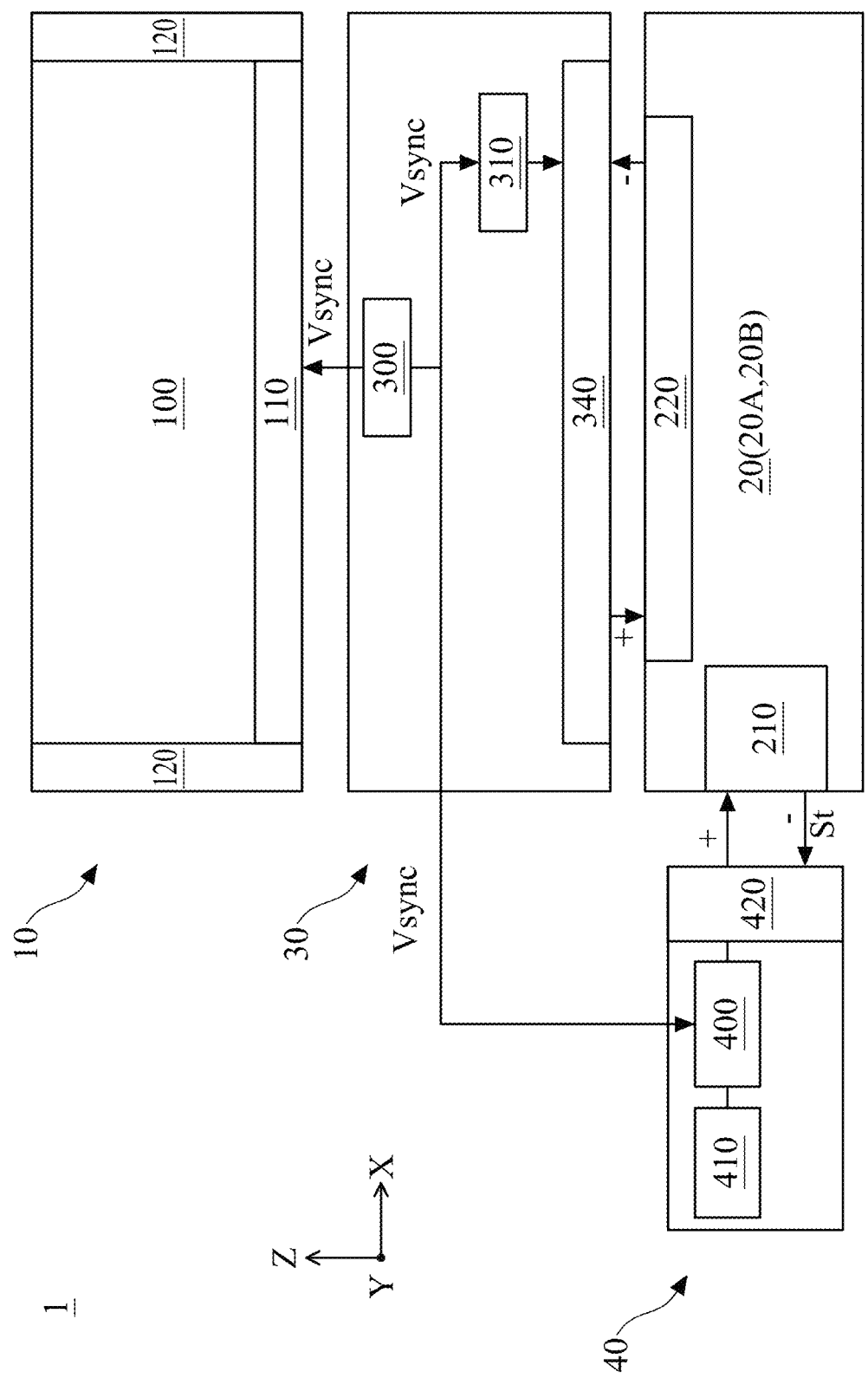
FIG. 1 illustrates a block diagram for explaining the principle of operating an electronic device, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms "about", "approximately", and "substantially" used herein generally refer to a given value or a range within 20%, preferably within 10%, and more preferably within 5%, within 3%, within 2%, within 1%, or within 0.5%. It should be noted that the amounts provided in the specification are approximate amounts, which means that even "about", "approximate", or "substantially" are not specified, the meanings of "about", "approximate", or "substantially" are still implied.

Some embodiments of the disclosure are described. Additional operations can be provided before, during, and/or after the stages described in these embodiments. Some of the stages that are described can be replaced or eliminated for different embodiments. Additional features can be added to the semiconductor device structure. Some of the features described below can be replaced or eliminated for different embodiments. Although some embodiments are discussed with operations performed in a particular order, these operations may be performed in another logical order.

The term "substantially" as used herein indicates the value of a given quantity that can vary based on a particular technology node associated with the subject semiconductor device. In some embodiments, based on the particular technology node, the term "substantially" can indicate a value of a given quantity that varies within, for example, ±5% of a target (or intended) value.

In the present disclosure, the length, thickness, width, height, distance and area can be measured using an optical microscope (OM), an electron microscope (such as a scanning electron microscope (SEM)) or measured by other methods, but the present disclosure is not limited thereto.

It should be understood that the electronic device of the present disclosure may include a semiconductor device, a semiconductor package device, a display device, a backlight device, a sensing device, an antenna device, a radar device, a light detection and ranging device, a touch display device, a curved display device, or a free shape device, but the present disclosure is not limited thereto. The electronic device may be a bendable or flexible electronic device. The electronic device may include, for example, a light-emitting diode, a liquid crystal, fluorescence, phosphorescence, other suitable display mediums, or a combination thereof, but the present disclosure is not limited thereto. The light-emitting diode may include, for example, an organic light-emitting diode (OLED), an inorganic light-emitting diode (LED), a submillimeter light-emitting diode (mini LED), a micro light-emitting diode (μLED), a quantum dot light-emitting diode (QDLEDs), the like, or a combination thereof, but the present disclosure is not limited thereto. The display device may include, for example, a stitching display device, but the present disclosure is not limited thereto. The concepts and the principles of the present disclosure may also be applied on a non-self light-emitting type liquid crystal display (LCD), but the present disclosure is not limited thereto.

The antenna device may be, for example, a 5G antenna, a beyond-5G antenna, a 6G antenna, a liquid crystal antenna, a phased array antenna, a low-orbit satellite antenna, or the like, but the present disclosure is not limited thereto. The antenna device may, for example, include a spliced antenna device, but the present disclosure is not limited thereto. It should be noted that the electronic device may be any combination of the above, but the present disclosure is not limited thereto.

Furthermore, the appearance of the electronic device may be rectangular-shape, circular-shape, polygon-shape, curved edge-shape, or the like. The electronic device may have a peripheral system (such as a driving system, a control system, a light source system, or a shelf system) to support the display device, the antenna device, or the splicing device. The electronic device of the present disclosure may be, for example, a display device, but the present disclosure is not limited thereto.

The present disclosure provides an electronic device, including a timing control unit used for providing a synchronization signal to a touch processing unit and a light source driving unit. In doing so, the touch processing unit and the light source driving unit may adjust their respective timing with the synchronization signal as a reference point, in order to prevent the signal cross interference from each other. Through such construction, the electronic device of the present disclosure prevent the signal cross interference between a touch element layer and a driving circuit of a light-emitting element layer, so the generation of display defects (for example, the ghost point) may be avoided. Simultaneously, the electronic device of the present disclosure may lower the associated cost and reduce the overall thickness.

FIG. 1 illustrates a block diagram for explaining the principle of operating an electronic device 1, according to some embodiments of the present disclosure. The electronic device 1 may include a display panel 10, a light-emitting element layer 220, a touch element layer 210, a timing control unit 300, a light source driving unit 310, and a touch processing unit 400. The light-emitting element layer 220 is used for proving a light source to the display panel 10. The touch element layer 210 is overlapped with the display panel 10. The timing control unit 300 is electrically connected to the display panel 10, and is used for proving a synchronization signal Vsync. The light source driving unit 310 is electrically connected to the light-emitting element layer 220, and is used for receiving the synchronization signal Vsync. The touch processing unit 400 is electrically connected to the touch element layer 210, and is used for receiving the synchronization signal Vsync. According to some embodiments, the electronic device 1 may include a light source module 20, a display circuit board 30, and a touch circuit board 40, but the present disclosure is not limited thereto. The display circuit board 30 may include the timing control unit 300 and the light source driving unit 310, while the touch circuit board 40 may include the touch processing unit 400.

Figure 3B:
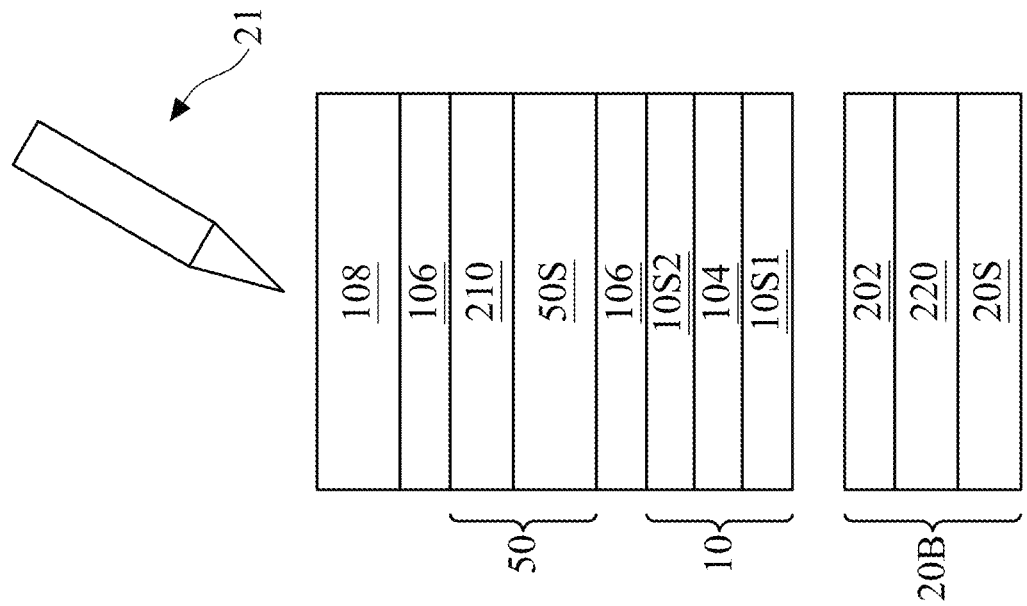
FIG. 3B illustrates a partial cross-sectional view of the electronic device, according to other embodiments of the present disclosure.
Figure 3A:
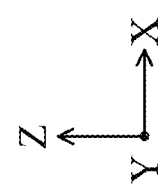
FIG. 3A illustrates a partial cross-sectional view of the electronic device, according to some embodiments of the present disclosure.
Figure 3A:
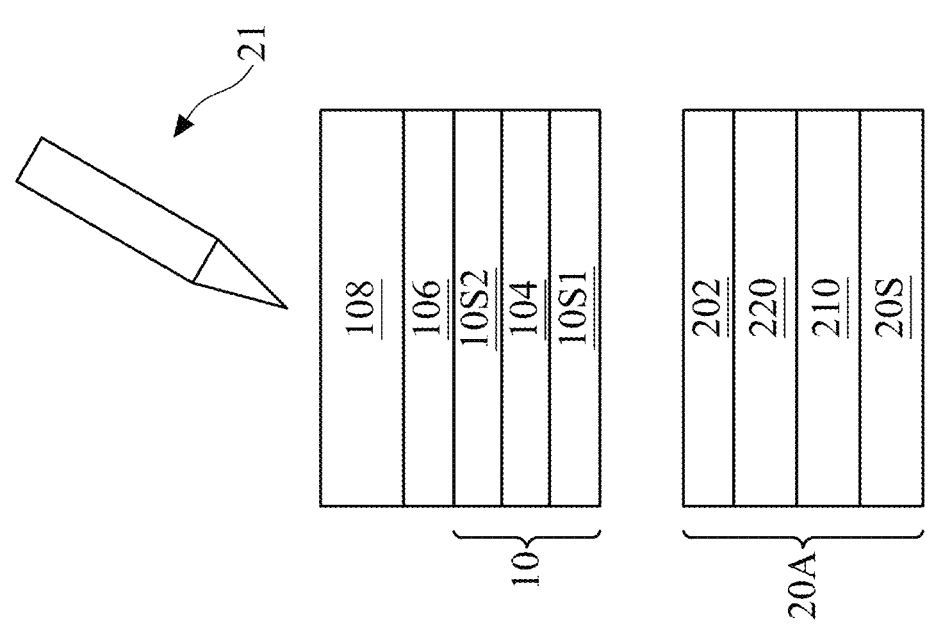

The position of the touch element layer 210 is not limited. For example, the touch element layer 210 may be in-cell type, such as embedded within the light source module 20. As shown in FIG. 3A, a light source module 20A may include the light-emitting element layer 220 and the touch element layer 210. Alternatively, the touch element layer 210 may be out-cell type, such as within a module separated from the light source module 20. As shown in FIG. 3B, the touch element layer 210 may also be disposed within a touch panel 50 separated from a light source module 20B.

Still referring to FIG. 1, the display circuit board 30 may include the timing control unit 300 and the light source driving unit 310. The timing control unit 300 may be electrically connect to the display panel 10, and may provide one or more of the synchronization signal Vsync to the display panel 10. For ease of description, FIG. 1 only shows one synchronization signal Vsync. As such, the display panel 10 may continuously display multiple frames based on multiple synchronization signals Vsync. The light source driving unit 310 may be electrically connected to the light-emitting element layer 220, and may be used for receiving one or more of the synchronization signal Vsync. The touch circuit board 40 may include the touch processing unit 400. The touch processing unit 400 may be electrically connect to the touch element layer 210, and may be used for receiving one or more of the synchronization signal Vsync. It should be appreciated that FIG. 1 is only used for explaining the principle of operating the electronic device 1, and is not intended to limit the position, the quantity, and the dimension of each element.

Figure 2:
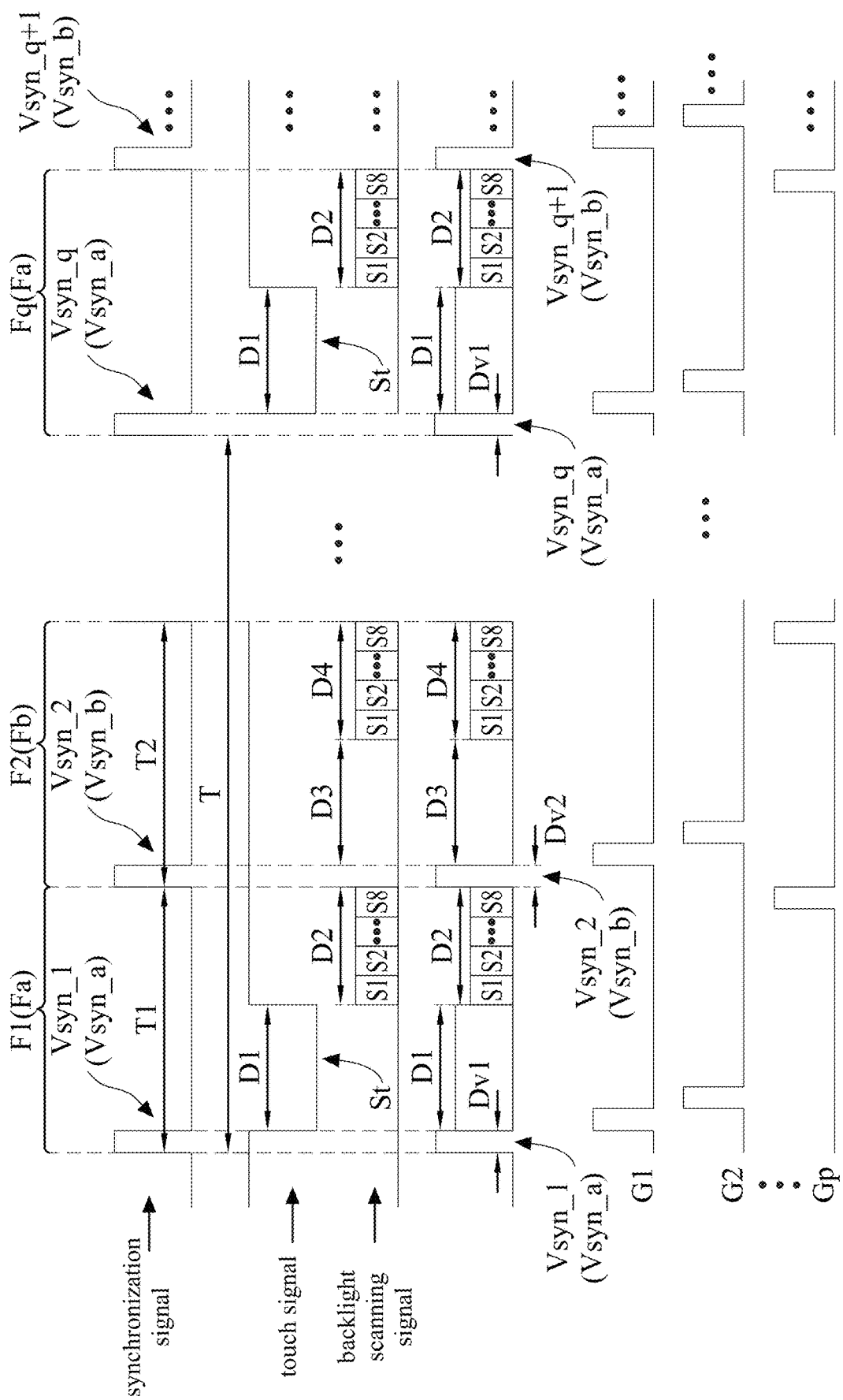
FIG. 2 illustrates a timing chart of a chronological relationship on a synchronization signal, a touch signal, and a backlight scanning signal, according to some embodiments of the present disclosure.

FIG. 2 illustrates a timing chart of the chronological relationship on a synchronization signal, a touch signal, and a backlight scanning signal, according to some embodiments of the present disclosure. The method of operating the electronic device 1 of the present disclosure will be explained in reference with FIG. 2. The display panel 10 may continuously display multiple frames (such as frames F1, F2 . . . and Fq) based on multiple synchronization signals (such as synchronization signals Vsyn_1, Vsyn_2 . . . Vsyn_q, and Vsyn_q+1). That is, one of the synchronization signals activates one of the frames, for example, the synchronization signal Vsyn_1 activates the frame F1, the synchronization signal Vsyn_2 activates the frame F2, and so on. An earliest duration of the frame F1 is a duration Dv1 of the synchronization signal Vsyn_1, an earliest duration of the frame F2 is a duration Dv2 of the synchronization signal Vsyn_2, and so on.

The timing control unit 300 may provide a first synchronization signal Vsyn_a and a second synchronization signal Vsyn_b. As shown in FIG. 2, the display panel 10 displays a first frame Fa based on the first synchronization signal Vsyn_a, and displays a second frame Fb based on the second synchronization signal Vsyn_b. A duration T1 of the first frame Fa may include the duration Dv1 of the first synchronization signal Vsyn_a, a first duration D1, and a second duration D2. Within the first duration D1, the touch processing unit 400 may receive a touch signal St from the touch element layer 210, in which the touch signal St is represented by the wave's lower position in FIG. 2. Within the second duration D2, the light source driving unit 310 may have the light-emitting element layer 220 perform scanning. In FIG. 2, the scanning of the light-emitting element layer 220 is denoted by scanning S1, S2 . . . and S8. For example, referring concurrently to FIG. 4, within the second duration D2, the scanning of eight scanning signal lines SC1-SCM (where M=8) is performed. The scanning S1 of FIG. 2 may represent the scanning of the scanning signal line SC1 being performed in FIG. 4, the scanning S2 of FIG. 2 may represent the scanning of the scanning signal line SC2 being performed in FIG. 4 . . . and the scanning S8 of FIG. 2 may represent the scanning of the scanning signal line SC8 being performed in FIG. 4.

As shown in FIG. 2, the first duration D1 and the second duration D2 are separated. In other words, the first duration D1 and the second duration D2 may be substantially adjacent to each other, or there may be a time space between the first duration D1 and the second duration D2. For example, as shown in FIG. 2, the first duration D1 and the second duration D2 in the first frame Fa may be adjacent to each other, that is, a latest time point in the first duration D1 and an earliest time point in the second duration D2 may be the same time point. According to other embodiments, there is a time space (not shown) between the first duration D1 and the second duration D2, that is, the latest time point in the first duration D1 and the earliest time point in the second duration D2 are different time points, with the time space between the time points. Within the time space, the touch processing unit 400 does not receive the touch signal St from the touch element layer 210, and the light-emitting element layer 220 does not perform scanning.

As shown in FIG. 2, the first duration D1 may be before the second duration D2, but the present disclosure is not limited thereto. Furthermore, as shown in FIG. 2, the second duration D2 of the first frame Fa may be substantially connected with the receiving time of the second synchronization signal Vsyn_b of the second frame Fb, but the present disclosure is not limited thereto. That is, the latest time point of the second duration D2 of the first frame Fa and the earliest time point of the second synchronization signal Vsyn_b of the second frame Fb are the same time point. In some embodiments, there is a space between the second duration D2 of the first frame Fa and the receiving time of the second synchronization signal Vsyn_b of the second frame Fb. In some embodiments, the time length of the first duration D1 may be between 1 msec and 12 msec, for example, from 2 msec to 10 msec or from 4 msec to 10 msec.

The time length of the second duration D2 may be between 1 msec and 12 msec, for example, from 2 msec to 10 msec or from 4 msec to 10 msec.

As shown in FIG. 1 and FIG. 2, the light source driving unit 310 and the touch processing unit 400 are used for receiving the first synchronization signal Vsyn_a and the second synchronization signal Vsyn_b. The display panel 10 may be used for displaying the first frame Fa and the second frame Fb, in which the second frame Fb is adjacent to the first frame Fa. The duration of the second frame Fb may include the duration Dv2 of the second synchronization signal Vsyn_b, a third duration D3, and a fourth duration D4. Within the third duration D3, the touch processing unit 400 may not receive the touch signal St from the touch element layer 210. Within the fourth duration D4, the light source driving unit 310 has the light-emitting element layer 220 perform scanning. The third duration D3 and the fourth duration D4 are separated. The third duration D3 may be before the fourth duration D4, but the present disclosure is not limited thereto.

As shown in FIG. 2, after a single or multiple second frames Fb including the third duration D3 are generated on the display panel 10, the first frame Fa including the first duration D1 may be generated again. Depending on the design requirement of the electronic device 1, the display panel 10 may be used for continuously displaying a plurality of frames, and the plurality of frames may include two of the first frames Fa sequentially displayed, and n of the second frames Fb between two of the first frames Fa. For example, as shown in FIG. 2, the display panel 10 may be used for continuously displaying the plurality of frames, which may include the frame F1 (or the first frame Fa), the frame Fq (or the first frame Fa), and n of the second frames Fb between the frame F1 (or the first frame Fa) and the frame Fq (or the first frame Fa). For example, n is a positive integer, and may be between 1 and 15, but the present disclosure is not limited thereto.

The starting times and the time lengths of the first duration D1, the second duration D2, the third duration D3, and the fourth duration D4 may be determined by providing the synchronization signal Vsync. In some embodiments, the ratio of the time length of the first duration D1 to the time length of the second duration D2 may be between 0.7 and 15, for example, between 1 and 12, between 1.5 and 10, or between 2 and 5. The ratio of the time length of the third duration D3 to the time length of the fourth duration D4 may be between 0.7 and 15, for example, between 1 and 12, between 1.5 and 10, or between 2 and 5. According to some embodiments, the first duration D1 may be larger than, equal to, or smaller than the second duration D2, and the third duration D3 may be larger than, equal to, or smaller than the fourth duration D4. In some embodiments, the time length of the third duration D3 may be between 1 msec and 12 msec, for example, from 2 msec to 10 msec or from 4 msec to 10 msec. The time length of the fourth duration D4 may be between 1 msec and 12 msec, for example, from 2 msec to 10 msec or from 4 msec to 10 msec.

Referring to FIG. 2, it should be appreciated that the time length of the duration T1 of the first frame Fa displayed by the display panel 10 may be larger than or equal to the sum of the time length of the first duration D1 and the time length of the second duration D2, while the time length of the duration T2 of the second frame Fb may also be larger than or equal to the sum of the time length of the third duration D3 and the time length of the fourth duration D4. For example, there is a time space between the first duration D1 and the second duration D2, in some embodiments.

The timing control unit 300 may provide the first synchronization signal Vsyn_a and the second synchronization signal Vsyn_b with a fixed cycle, such that each frame displayed by the display panel 10 has the same time length. In some embodiments, the time length of the duration T1 of the first frame Fa and the time length of the duration T2 of the second frame Fb may be equal, but the present disclosure is not limited thereto. According to some embodiments, the duration T1 may be smaller than the duration T2, or the duration T1 may be larger than the duration T2. Every frame may also have the time length different from each other. In some embodiments, the first duration D1 included in each of the first frames Fa displayed by the display panel 10 has the same time length, and the second duration D2 included in each of the first frames Fa has the same time length.

As shown in FIG. 2, according to some embodiments, since the first duration D1 and the second duration D2 are separated, the electronic device 1 of the present disclosure may prevent the signal cross interference between the touch element layer 210 and the driving circuit of the light-emitting element layer 220, so the generation of the display defects (for example, the ghost point) and/or the noise may be avoided. The configuration of the display panel 10, the display circuit board 30, and the touch circuit board 40 will be further explained in reference with FIG. 1 again.

As shown in FIG. 1, the display circuit board 30 may further include an electrical connect unit 340. The display circuit board 30 may be electrically connected to the light-emitting element layer 220 in the light source module 20 through the electrical connect unit 340.

As shown in FIG. 1, the touch circuit board 40 may further include a microcontroller unit 410 and a sensor connect unit 420. The microcontroller unit 410 may be used to calculate the touch signal St from the touch element layer 210 to obtain a touch coordinate. The touch circuit board 40 may be electrically connected to the touch element layer 210 in the light source module 20 through the sensor connect unit 420.

The display panel 10 may be any suitable display panel, for example, a liquid crystal display panel, an organic light-emitting diode display panel, or an inorganic light-emitting diode display panel, but the present disclosure is not limited thereto. In some embodiments, as shown in FIG. 1, the display panel 10 includes a display area 100, a source driving unit 110, and a gate driving unit 120. A plurality of display units (not shown) may be a matrix array disposed within the display area 100. That is, the plurality of display units may be arranged along a first direction (x-direction) and a second direction (y-direction). The first direction and the second direction are different, for example, may be perpendicular with each other.

In FIG. 1, although not shown, a plurality of gate lines may be disposed extending along the first direction (x-direction), and may be electrically connected to the gate driving unit 120. Each gate line may be electrically connected to each row of the display units. According to some embodiments, the quantity of the gate driving unit 120 may be one, two, or more, but the present disclosure is not limited thereto. Two of the gate driving unit 120 are displayed in FIG. 1. A portion in the plurality of gate lines may be electrically connected to the left gate driving unit 120, and another portion in the plurality of gate lines may be electrically connected to the right gate driving unit 120. Although not shown, a plurality of data lines may be disposed extending along the second direction (y-direction), and may be electrically connected to the source driving unit 110. Each data line may be electrically connected to each column of the display units.

As stated above, every display unit may be electrically connected to the gate driving unit 120 through one gate line, and may be electrically connected to the source driving unit 110 through one data line. The display units may be used for displaying the three original color signals, for example, red, green, and blue, but the present disclosure is not limited thereto. The display units may include a pixel electrode and a corresponding driving unit (for example, a thin-film transistor (TFT)), and the details are not described again herein to avoid repetition. The source driving unit 110 may be used for inputting the signal to the display units in the display area 100, while the gate driving unit 120 may be used for implementing the switching operation of every row of the display units (or the pixel units) in the display area 100. When the display panel 10 performs scanning in the display area 100, the gate driving unit 120 may sequentially activate an entire row of pixels, allowing the source driving unit 110 to be responsible for the signal input operation of the display area 100 to provide the required signals of the pixels in the display area 100. For example, the gate driving unit 120 may be used for performing scanning on the display panel 10 during the duration T1 of the first frame Fa. As such, the gate driving unit 120 may sequentially activate (or scan) the first row, the second row . . . to the final row of the display units.

That is, as shown in FIG. 2, a gate line G1 performs scanning on the first row of the display units, a gate line G2 performs scanning on the second row of the display units . . . the gate line Gp performs scanning on the $p^{th}$ row of the display units. As such, the time for the gate driving unit 120 to complete scanning the first row, the second row . . . to the last row (or the $p^{th}$ row) of the display units is the time of one frame. Within the duration T1 of the first frame Fa, the gate driving unit 120 performs scanning on the plurality of display units within the display panel 10 through the gate lines G1, G2 . . . and Gp. Similarly, within the duration T2 of the second frame Fb, the gate driving unit 120 performs scanning on the plurality of display units within the display panel 10 through the gate lines G1, G2 . . . and Gp. In some embodiments, the gate line G1 may begin scanning after the first synchronization signal Vsyn_a or the second synchronization signal Vsyn_b, but the present disclosure is not limited thereto. In some embodiments, as shown in FIG. 2, upon the conclusion of scanning the gate line Gp, the first synchronization signal Vsyn_a or the second synchronization signal Vsyn_b is received instantly, but the present disclosure is not limited thereto. In some embodiments, as shown in FIG. 2, the scanning time of each of the gate lines G1, G2 . . . and Gp is connected to each other, but the present disclosure is not limited thereto. In some embodiments, the scanning time of the gate line G1 may be overlapped with the first synchronization signal Vsyn_a or the second synchronization signal Vsyn_b.

As shown in FIG. 2, according to some embodiments, in the frame F1 (or the first frame Fa), the gate driving unit 120 performs scanning on the plurality of display units sequentially row by row in the display panel 10, and in the frame F2 (or the second frame Fb), the gate driving unit 120 also performs scanning similarly. That is, the gate driving unit 120 performs scanning, which is not cut off due to the touch signal or the backlight scanning signal. According to some embodiments, the first duration D1 of receiving the touch signal may be at least partially overlapped with the scanning time of one or more of the gate lines. According to some embodiments, the second duration D2 of the light-emitting element layer 220 performing scanning may be at least partially overlapped with the scanning time of another one or more of the gate lines.

FIG. 3A illustrates a partial cross-sectional view of the electronic device 1, according to some embodiments of the present disclosure. As shown in FIG. 3A, the electronic device 1 includes the display panel 10, the light source module 20A, and a cover substrate 108. The display panel 10 is disposed on the light source module 20A. The display panel 10 includes a first substrate 10S1, a second substrate 10S2, and a display layer 104 disposed between the first substrate 10S1 and the second substrate 10S2. The cover substrate 108 is adhered with the display panel 10 through an adhesion material 106. The light-emitting element layer 220 and the touch element layer 210 may be overlapped in the z-direction. The first substrate 10S1 and the second substrate 10S2 may each be a rigid substrate or a flexible substrate. The first substrate 10S1 and the second substrate 10S2 may be glass, plastic, quartz, or a combination thereof.

The present disclosure does not limit the types of the display layer 104. In some embodiments, the display layer 104 may include a liquid crystal layer, a pixel layer, an electrode layer, a wiring layer, or the like, but the present disclosure is not limited thereto. In other embodiments, the display layer 104 may include an organic light-emitting layer.

The adhesion material 106 may be used for adhering the display panel 10 and the cover substrate 108. The adhesion material 106 may include a light-transmitting material, for example, silicon resin, epoxy resin, acrylic resin, the like, or a combination thereof, but the present disclosure is not limited thereto.

The humidity may be further prevented from entering into the interior space of the display panel 10 by placing the cover substrate 108 on the display panel 10. According to some embodiments, when the cover substrate 108 is rigid enough, the damage to the display panel 10 may be prevented if the electronic device 1 is collided with foreign objects, but the present disclosure is not limited thereto. Materials of the cover substrate 108 may include glass, polyimide (PI), polyethylene terephthalate (PET), the like, or a combination thereof, but the present disclosure is not limited thereto.

In some embodiments, as shown in FIG. 3A, the light source module 20A includes a substrate 20S, the touch element layer 210, the light-emitting element layer 220, and an optical film 202. The light-emitting element layer 220 and the touch element layer 210 are disposed on the same substrate (such as the substrate 20S). The touch element layer 210 may include a touch electrode and a touch wire, which are not shown for ease of description. The touch electrode may be electrically connected to the touch processing unit 400 through the touch wire. For example, the touch element layer 210 may include a single layer of the touch wire, or a double layer of the touch wire, but the quantity of the touch wire is not limited thereto. In some embodiments, the touch element layer 210 may include an electromagnetic loop. As shown in FIG. 3A, the electronic device 1 may further include an electromagnetic sensing element 21 that may be used for sensing the electromagnetic loop within the touch element layer 210. More specifically, the electromagnetic sensing element 21 may be elements, for example, a touch pen or the like, but the present disclosure is not limited thereto. The electromagnetic loop within the touch element layer 210 may be used for performing scanning to identify a coil loop of a touch coordinate of the electromagnetic sensing element 21.

More specifically, within the range of the magnetic field generated by charging the touch element layer 210, a resonance loop from the electromagnetic sensing element 21 may accumulate a weak electric energy. After the energy is accumulated by the touch pen, a control loop of the touch element layer 210 would stop providing electric current to the coil loop, and the coil loop is connected to the receiving loop. The energy accumulated by the electromagnetic sensing element 21 may then be transported back to the touch wire of the touch element layer 210 through the free oscillation of the resonance loop. After the energy is transported back to the touch element layer 210, the control loop may first perform scanning on the coil loop of the touch element layer 210, in order to initially detect an approximate position of the touch pen. Next, the scanning is performed on multiple coil loops surrounding the electromagnetic sensing element 21, and the detected signal would perform calculation in the touch circuit board 40. In doing so, the coordinate value of the electromagnetic sensing element 21 may be accurately calculated.

In some embodiments, the touch element layer 210 may include multiple touch electrodes, which may include transmitting electrodes, sensing electrodes, capacitive electrodes, resistive electrodes, or a combination thereof.

Still referring to FIG. 3A, the light-emitting element layer 220 may be disposed between the display panel 10 and the touch element layer 210. Furthermore, the light-emitting element layer 220 may include light-emitting units and light-emitting wiring layers used for electrically connecting to a plurality of signal lines of the light-emitting units. As shown subsequently in FIG. 4, the above light-emitting wiring layers may have scanning signal lines SC and channel signal lines CH that are electrically connected to each of light-emitting units L. The present disclosure does not limit the types of the light-emitting units L. For example, the light-emitting units L may be light-emitting diodes or other suitable light source. In some embodiments, as shown in FIG. 3A, the light source module 20A further includes an optical film 202 disposed between the light-emitting element layer 220 and the display panel 10. Materials of the optical film 202 may include polyethylene terephthalate, polymethyl methacrylate (PMMA), polyethylene naphthalate (PEN), polyvinylidene difluoride (PVDF), cellulose triacetate (TAC), wavelength transformation materials, fluorescence, phosphorescence, the like, or a combination thereof, but the present disclosure is not limited thereto. The optical film 202 may include a diffusion film, a brightness enhancement film (BEF), a wavelength transformation film, a quantum dot film, a blue light gain film, a prism lens, or a combination thereof. The optical film 202 may be a single layer or a multiple layer.

FIG. 3B illustrates a partial cross-sectional view of the electronic device 1, according to other embodiments of the present disclosure. As shown in FIG. 3B, the electronic device 1 may further include a touch panel 50 disposed on the display panel 10, and the touch panel 50 includes the touch element layer 210. In some embodiments, the touch panel 50 further includes a substrate 50S. The substrate 50S may include the same or similar materials as the first substrate 10S1 and the second substrate 10S2. The touch panel 50 may be adhered between the cover substrate 108 and the display panel 10 through the adhesion material 106.

Figure 4:
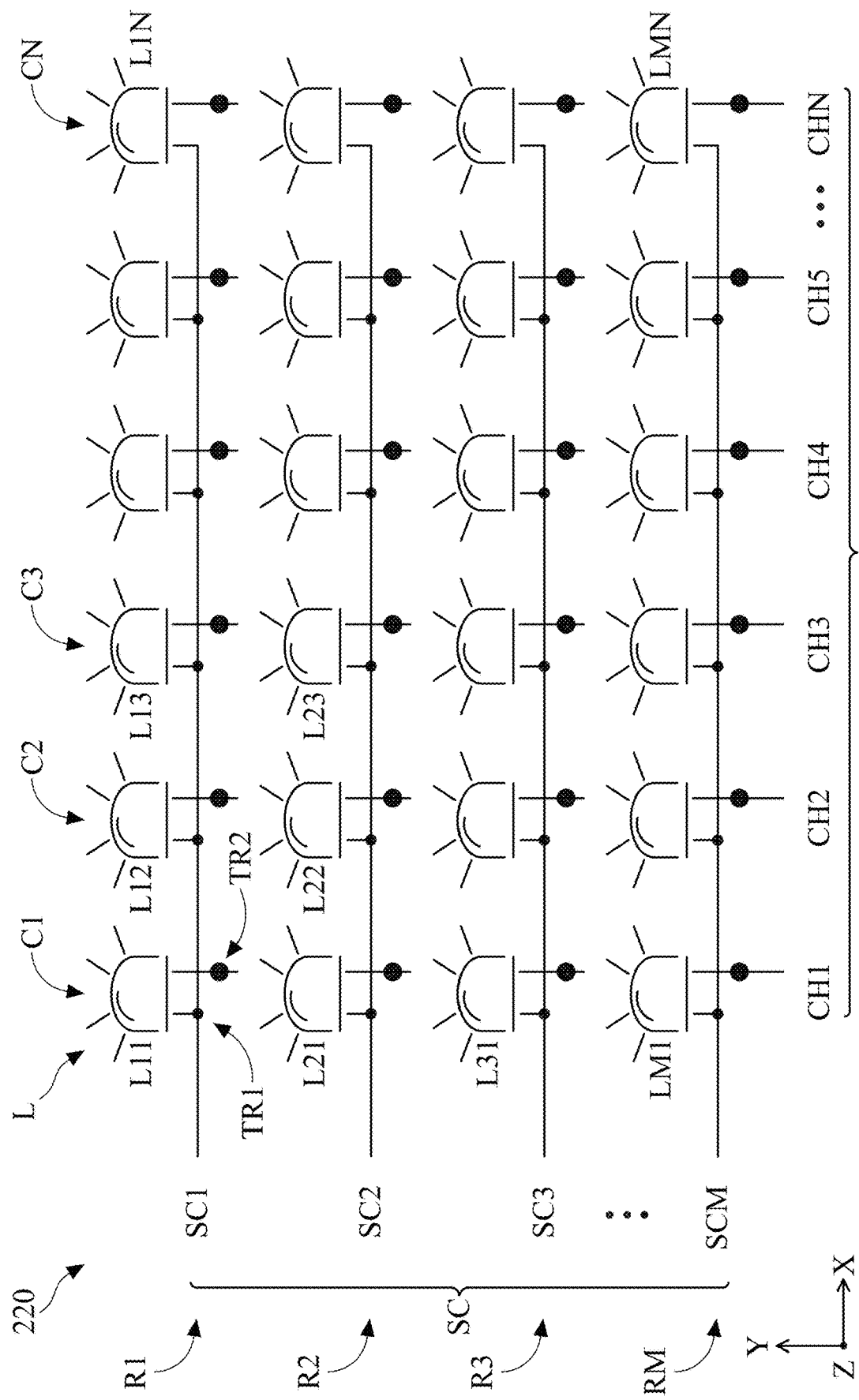
FIG. 4 illustrates a schematic diagram of driving each light-emitting unit of a light-emitting element layer.

FIG. 4 illustrates a schematic diagram of driving each of the light-emitting units L of the light-emitting element layer 220. The light-emitting element layer 220 in FIG. 4 may be the light-emitting element layer 220 shown in FIG. 3A and FIG. 3B. Referring to FIG. 4, the light-emitting element layer 220 may include the plurality of light-emitting units L (for example, light-emitting units L11-LMN), the plurality of scanning signal lines SC, and the plurality of channel signal lines CH disposed on the substrate 20S. For example, the plurality of scanning signal lines SC may include M of the scanning signal lines SC1, SC2, SC3 . . . and SCM extending in the first direction (x-direction), which are electrically connected to each of the corresponding light-emitting units L. On the other hand, the plurality of channel signal lines CH may include N of the channel signal lines CH1, CH2, CH3, CH4, CH5 . . . and CHN extending in the second direction (y-direction), which are electrically connected to each of the corresponding light-emitting units L. The first direction and the second direction are different, for example, the first direction is perpendicular to the second direction. It should be appreciated that the present disclosure does not limit the quantity and the spatial configuration of the scanning signal lines SC and the channel signal lines CH.

As shown in FIG. 4, the plurality of light-emitting units L may be a matrix array, for example, may include M×N of the light-emitting units L disposed on the substrate 20S. M and N are positive integers, where M may be larger than, smaller than, or equal to N. M and N may each be between 1 and 150, for example, between 1 and 128, between 2 and 128, between 2 and 100, between 2 and 50, between 4 and 25, between 4 and 20, or between 5 and 15. When M=1, N is larger than 1 and within the above ranges. When N=1, M is larger than 1 and within the above ranges. More specifically, the plurality of light-emitting units L include M rows and N columns of the light-emitting units L, the rows are extending along the first direction (x-direction), while the columns are extending along the second direction (y-direction). Each of the light-emitting units may be labelled as "Lab", which denotes the light-emitting unit L at the $a^{th}$ row and at the $b^{th}$ column. For example, the light-emitting unit L at the $1^{st}$ row and at the $1^{st}$ column may be denoted as the light-emitting unit L11, the light-emitting unit L at the $2^{nd}$ row and at the $1^{st}$ column may be denoted as the light-emitting unit L21, and the light-emitting unit L at the $2^{nd}$ row and at the $3^{rd}$ column may be denoted as the light-emitting unit L23.

The plurality of light-emitting units L may be straight-down backlight units (BLU) that provide light sources to the display panel 10. The plurality of light-emitting units L may be scanning backlight units, that is, M×N of the light-emitting units L may be sequentially activated based on the scanning signals. As shown in FIG. 4, take the light-emitting unit L11 for example, a first terminal TR1 of the light-emitting unit L11 may be electrically connected to the scanning signal line SC1, while a second terminal TR2 of the light-emitting unit L11 may be electrically connected to the channel signal line CH1. According to some embodiments, the first terminal TR1 may be a positive pole, and the second terminal TR2 may be a negative pole. According to some embodiments, the first terminal TR1 may be the negative pole, and the second terminal TR2 may be the positive pole. The light-emitting units L in the same row may be electrically connected to the same scanning signal line, for example, the light-emitting units L11, L12 . . . and L1N of the same row are electrically connected to the scanning signal line SC1. The light-emitting units L in the same column may be electrically connected to the same channel signal line, for example, the light-emitting units L11, L21 . . . and LM1 of the same column are electrically connected to the channel signal line CH1.

The light source driving unit 310 may determine the amount of conducting current of each of the channel signal lines CH, so the luminance of the light-emitting units L may be determined. After the corresponding light-emitting units L are activated sequentially by the scanning signal line SC1 to the scanning signal line SCM, such activation sequence may be repeated by being directed back to the scanning signal line SC1, in order to accomplish the continuous scanning of the scanning signal lines SC. The light-emitting units L may be electrically connected to the scanning signal lines SC through a switching element (not shown), which may control the conductivity of the scanning signal lines SC. The scanning signal lines SC1, SC2 . . . SCM are turned on chronologically to complete the scanning of M×N of the light-emitting units L.

For example, as shown in FIG. 2, under the circumstance where there are 8 of the scanning signal lines SC (take M=8 for example), within the second duration D2, the scanning signal lines SC1, SC2 . . . and SC8 are chronologically turned on to complete the scanning of all M×N of the light-emitting units L. The data may be input by the channel signal lines CH, and the luminance and the dimming information of every column of the light-emitting units L may be controlled based on the data. As such, in the light-emitting element layer 220, the luminance and the dimming information of each of the light-emitting units L may be controlled by the scanning of the scanning signal lines SC and the input data from the channel signal lines CH, in order to achieve the compartmentalized luminance variation of the light-emitting units L of the light-emitting element layer 220.

In summary, the present disclosure provides the electronic device, including the timing control unit used for providing the synchronization signal to the touch processing unit and the light source driving unit. In doing so, the touch processing unit and the light source driving unit may adjust their respective timing with the synchronization signal as the reference point, in order to prevent or reduce the signal cross interference between the touch element layer and the driving circuit of the light-emitting element layer, so the generation of the display defects (for example, the ghost point) may be avoided or decreased.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
    a display panel;
    a light-emitting element layer used for providing a light source to the display panel;
    a touch element layer overlapping the display panel;
    a timing control unit electrically connected to the display panel and used for providing a first synchronization signal;
    a light source driving unit electrically connected to the light-emitting element layer and used for receiving the first synchronization signal; and
    a touch processing unit electrically connected to the touch element layer and used for receiving the first synchronization signal, wherein the display panel is used for displaying a first frame, and a duration of the first frame comprises a duration of the first synchronization signal, a first duration, and a second duration, wherein within the first duration, the touch processing unit receives a touch signal from the touch element layer, and within the second duration, the light source driving unit has the light-emitting element layer perform scanning, wherein the first duration and the second duration are separated.

2. The electronic device of claim 1, wherein the timing control unit is used for providing a second synchronization signal, and the light source driving unit and the touch processing unit are used for receiving the second synchronization signal, wherein the display panel is further used for displaying a second frame adjacent to the first frame, wherein a duration of the second frame comprises a duration of the second synchronization signal, a third duration, and a fourth duration, wherein within the third duration, the touch processing unit does not receive the touch signal from the touch element layer, and within the fourth duration, the light source driving unit has the light-emitting element layer perform scanning, wherein the third duration and the fourth duration are separated.

3. The electronic device of claim 2, wherein a length of the first frame equals a length of the second frame.

4. The electronic device of claim 2, wherein the timing control unit provides the first synchronization signal or the second synchronization signal with a fixed cycle.

5. The electronic device of claim 2, wherein performing scanning is continuous between the first frame and the second frame.

6. The electronic device of claim 2, wherein the display panel is used for continuously displaying a plurality of frames, wherein the frames comprise two of the first frames sequentially displayed, and n of the second frames between the two of the first frames, wherein n is a positive integer between 1 and 15.

7. The electronic device of claim 1, wherein the touch processing unit determines the first duration according to the first synchronization signal.

8. The electronic device of claim 7, wherein a time length of the first duration is between 1 msec and 12 msec.

9. The electronic device of claim 1, wherein the light source driving unit determines the second duration according to the first synchronization signal.

10. The electronic device of claim 1, wherein in the first frame, the first duration is before the second duration.

11. The electronic device of claim 1, further comprising a substrate, wherein the light-emitting element layer and the touch element layer are disposed on the substrate.

12. The electronic device of claim 11, wherein the light-emitting element layer is disposed between the display panel and the touch element layer.

13. The electronic device of claim 12, wherein the display panel, the light-emitting element layer, and the touch element layer overlap in a vertical direction.

14. The electronic device of claim 1, further comprising a touch panel disposed on the display panel, wherein the touch panel comprises the touch element layer.

15. The electronic device of claim 1, wherein the touch element layer comprises an electromagnetic loop.

16. The electronic device of claim 15, further comprising an electromagnetic sensing element used for sensing the electromagnetic loop within the touch element layer.

17. The electronic device of claim 1, further comprising a gate driving unit used for the display panel to perform scanning within the duration of the first frame.

18. The electronic device of claim 1, wherein the light-emitting element layer comprises light-emitting wiring layers respectively having signal wires used for electrically connecting to the light source.

19. The electronic device of claim 1, wherein the touch element layer comprises touch wiring layers electrically connected to the touch processing unit.

20. The electronic device of claim 1, wherein the touch element layer is an electromagnetic plate.

* * * * *